United States Patent
Hoellriegl et al.

(10) Patent No.: US 11,565,458 B2
(45) Date of Patent: Jan. 31, 2023

(54) APPARATUS FOR FORMING PLASTIC PREFORMS INTO PLASTIC CONTAINERS WITH PREFORM COOLING

(71) Applicant: KRONES AG, Neutraubling (DE)

(72) Inventors: Thomas Hoellriegl, Teublitz (DE); Markus Stiegler, Parsberg (DE); Oliver Apfelbacher, Edelsfeld (DE); Markus Kulzer, Zell (DE); Gerald Huettner, Vilseck (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/363,822

(22) Filed: Jun. 30, 2021

(65) Prior Publication Data

US 2022/0009148 A1 Jan. 13, 2022

(30) Foreign Application Priority Data

Jul. 13, 2020 (DE) ...................... 10 2020 118 469.7

(51) Int. Cl.
*B29C 49/58* (2006.01)
*B29L 31/00* (2006.01)

(52) U.S. Cl.
CPC ...... *B29C 49/58* (2013.01); *B29C 2049/5827* (2013.01); *B29C 2049/5841* (2013.01); *B29L 2031/7158* (2013.01)

(58) Field of Classification Search
CPC ............ B29C 49/58; B29C 2049/5827; B29C 2049/5841
See application file for complete search history.

(56) References Cited

U.S. PATENT DOCUMENTS

| | | | | |
|---|---|---|---|---|
| 3,466,702 A | * | 9/1969 | Stenger | B29C 49/76 425/215 |
| 3,969,060 A | * | 7/1976 | Rosenkranz | B29C 49/58 425/530 |
| 6,221,305 B1 | * | 4/2001 | Lopez | B29C 49/76 425/525 |
| 6,923,022 B1 | * | 8/2005 | Dodd | C03B 9/385 65/300 |
| 2002/0053760 A1 | | 5/2002 | Boyd et al. | |
| 2015/0231812 A1 | | 8/2015 | Klatt et al. | |

FOREIGN PATENT DOCUMENTS

EP 3 064 336 A1 9/2016

* cited by examiner

*Primary Examiner* — Robert B Davis
(74) *Attorney, Agent, or Firm* — Schmeiser, Olsen & Watts, LLP

(57) ABSTRACT

Provided is an apparatus for forming plastic preforms into plastic containers, having a blow mould which forms a cavity within which the plastic preforms can be expanded to form the plastic containers, and having an application device which is suitable and intended for acting upon the plastic preforms with a flowable medium in order to expand them, which is suitable and intended for acting upon the plastic preforms with a flowable medium in order to expand them, wherein the application device is placed against a mouth area of the plastic preforms in order to act upon these with the flowable medium. The application device forms at least one first flow channel for the flowable medium, which guides and/or directs at least a portion of the flowable medium to an inner wall of the mouth area in order to temper and, in particular, cool this inner wall.

10 Claims, 4 Drawing Sheets

APPARATUS FOR FORMING PLASTIC PREFORMS INTO PLASTIC CONTAINERS WITH PREFORM COOLING

CROSS-REFERENCE TO RELATED APPLICATION

This application claims priority to German Application No. 10 2020 118 469.7, having a filing date of Jul. 13, 2020, the entire contents of which are hereby incorporated by reference.

FIELD OF TECHNOLOGY

The following relates to an apparatus and a method for forming plastic preforms into plastic containers. In the beverage manufacturing industry, it is known that heated plastic preforms are formed into containers by application of a flowable medium, in particular blown air.

BACKGROUND

The following relates in particular to such devices which use blown air to expand the plastic preforms. However, it is pointed out that an application is also possible for such devices which directly fill the plastic preforms with a liquid, in particular a beverage to be filled. In the conventional art, the preforms are therefore inflated by pressure with the aid of a blowing nozzle. The blowing nozzle also serves as a sealing element in the area of the mouth section. The inflated container is cooled by a cooling medium (i.e., cooling water) via a blow mould and formed and pressed against it with compressed air.

In the process, heat is extracted from the container or its material, for example PET, at the outer contact surface. During inflation, the compressed air for blowing is supplied through the blowing nozzle between a stretching mandrel and/or a stretching rod and the inner part of the blowing sleeve and is also returned in this way during venting or is released or vented via a valve.

At high machine output, the cooling may not be sufficient, which leads to a decrease in mould stability and deformation of the container when it is removed from the mould. Especially in mould areas where the wall thickness is thicker or cannot be stretched sufficiently, the cooling is too short and/or insufficient. This occurs in the bottom and in the mouthpiece shoulder area (directly under a support ring).

The plastic preforms are usually expanded via several pressure stages, for example a pre-blowing stage and a final blowing stage. The pre-blowing and final blowing air is supplied via a blowing piston block in which a blowing piston is arranged. In the blowing piston, the air flows through a guide bush and then through a nozzle into the mouthpiece. In the conventional art, turbulent air flow can occur here, for example, and this can result in losses in the inflow speed and thus also losses in the process time. In addition, a reduced cooling effect at the mouthpiece is also partly caused in this way. This is of increasing importance due to the on and on increasing station capacities.

SUMMARY

An aspect relates to an improved cooling of the plastic preforms during this expansion process. In addition, the process times should also be advantageously shortened.

An apparatus according to embodiments of the invention for forming plastic preforms into plastic containers has a blow mould which forms a cavity within which the plastic preforms can be expanded into the plastic containers. Furthermore, an application device is provided which is suitable and intended for acting upon the plastic preforms with a flowable medium and in particular a gaseous medium in order to expand them. The application device can be placed against a mouth area of the plastic preforms in order to act upon them with the flowable medium.

According to embodiments of the invention, the application device forms at least one first flow channel for the flowable medium, which guides and/or directs at least a portion of the flowable medium to an inner wall of the mouth area in order to temper and, in particular, cool this inner wall.

Therefore, a blowing nozzle is proposed which guides at least a portion and exactly one portion of the blowing air to the inner region of the mouth area of the plastic preform. In this way, cooling is already achieved during the expansion process and in particular cooling in those more critical areas where the wall thickness of the plastic preform is higher.

In an embodiment, the blow mould has two side parts and a bottom part. These parts are movable with respect to each other to open and close the blow mould. In this way, a plastic preform can be inserted into the blow mould and, after the expansion process, the expanded container can also be removed from the blow mould.

In an embodiment, the apparatus also has a stretching rod or, more generally, a rod-like body that can be inserted into the plastic preforms in order to expand them in their longitudinal direction. It is possible that a portion of the blowing air (or generally of the expansion medium) is transported or guided between the mouth area of the plastic preform and this rod-like body. It would also be possible for a portion of the blowing air to be transported through the rod-like body itself. In an embodiment, the rod-like body is therefore designed as a hollow rod.

In an embodiment, the application device is designed as a blowing nozzle. This can be applied to a mouth area of the plastic preform in order to inflate it. In an embodiment, this blowing nozzle is sealed off with respect to a region of the plastic preform, such as in particular its support ring. However, sealing against the mouth edge of the plastic preform would also be possible.

As explained in more detail below, the blowing nozzle may contain bores and/or elongated holes through which the compressed air can flow. In particular, these bores and/or elongated holes allow the blowing air to escape also in a radial direction in order to guide the blowing air to the mouth section of the plastic preform and thereby to cool the mouth section from the inside, wherein thereby a cooling effect on the inner wall is created.

The cooling medium flows from the top downwards into the bottle to be inflated through the bores contained in the blowing nozzle, which are arranged, for example, directly between the inner wall of the mouth and a guide sleeve.

In an embodiment, the application device or blowing nozzle seals on the outside at the mouth section.

When the air is released or escapes, the compressed air flows directly past the inner wall and cools this surface through the air flowing past and the convection that is forced as a result.

Furthermore, a further cooling effect occurs due to the pressure reduction or expansion of the compressed air.

By raising the blowing nozzle during venting, it can be vented even faster and at the same time the physical "Joule-Thompson effect" can be used.

The greater the pressure reduction and the greater the air flow, the greater is the cooling in the mouth area.

Preference is given to ensuring that the compressed air flows in and out of the area where the most heat is present and where the greatest cooling is required.

Advantageously, lifting of the blowing nozzle from the plastic preform occurs by a range of more than 0.2 mm, more than 0.4 mm, more than 0.6 mm, more than 0.8 mm or more than 1.0 mm. In an embodiment, the blowing nozzle is lifted by less than 30 mm, by less than 20 mm, by less than 15 mm or by less than 10 mm.

The proposed procedure achieves better cooling of the mouth area and thus the mould stability is increased. The finished blow-moulded bottle can be removed from the blow mould more quickly and in this way the machine output can be increased. Difficult or heavy containers can also be processed more stably.

Investigations have shown that a considerable cooling effect can be achieved by passing the inflowing and/or outflowing blowing air past the inner wall of the plastic preform.

In an advantageous embodiment described in more detail below, a slotted nozzle is provided, which can also be closed at its underside (but can also be fully or partially open, if necessary, with a reduced opening cross-section).

In this way, a cooling effect of the mouthpiece occurs, wherein the air rubs against its surface. When designing such blowing nozzles, different criteria are taken into account, such as the desired station performance or also the weight of the respective mouthpiece of the plastic preform, which has continued to decrease over the last years. The advantageous slot design described below allows direct cooling of the mouthpiece as the air flows in.

In an embodiment, the application device forms at least two at least partially separated flow paths for the flowable medium, wherein at least one of these flow paths being designed in such a way that it guides and/or directs at least a portion of the flowable medium to an inner wall of the mouth area.

In an embodiment, the second flow path is designed such that it does not direct the flowable medium onto an inner wall of the mouth area. Rather, this second flow path directs the air directly into the interior of the container, for example in a direction which extends parallel to a longitudinal direction of the plastic preform to be expanded. The blown air passing through this second flow path advantageously does not touch the inner wall of the plastic preform and, in particular, does not touch the inner wall in the region of the mouth section of the plastic preform.

In an embodiment, the application device is designed in such a way that a bottom area of the plastic preform can also be cooled. This can be achieved, for example, by the stretching rod being designed in such a way that a certain proportion of the blown air is also guided through it directly into a bottom area of the plastic preform.

In an embodiment, the application device comprises a tubular body projecting inside the plastic preform during expansion of the plastic preform, which forms the flow path of the flowable medium that does not reach the inner wall of the mouth area.

This tubular section has a length which is less than the length of the plastic preform to be expanded, less than half the length of the plastic preform to be expanded, or less than one third of the length of the plastic preform to be expanded. In an embodiment, the length of the tubular portion is chosen to extend along at least one (external) thread of the plastic preform. In an embodiment, the tubular body extends at least to the position of a support ring of the plastic preform (relative to its height position).

In an embodiment, the tubular body has a length greater than 3 mm, greater than 5 mm, greater than 8 mm, greater than 10 mm, or greater than 15 mm. In an embodiment, the tubular body has a length that is less than 80 mm, less than 70 mm, less than 60 mm, or less than 50 mm.

In an embodiment, this tubular body or tubular section is rotationally symmetrical with respect to a longitudinal axis of the application device.

The longitudinal axis of the application device is in particular also the longitudinal direction of the plastic preforms to be expanded.

In an embodiment, the apparatus has a drive device which moves this application device, in particular along this longitudinal axis, in the direction of the plastic preform or feeds it towards the plastic preform.

In a further advantageous embodiment, the first flow path runs at least partially radially outside the second flow path.

In an embodiment, the flow paths run together at least in sections. Thus, it is possible for the flow paths to split at a certain area. Thus, for example, the first flow path can run essentially through the tubular body and the first flow path can deviate from this, for example through openings.

In an embodiment, the first flow path surrounds the second flow path in a circumferential direction of the application device. In an embodiment, the first flow path completely surrounds the second flow path in this circumferential direction. This can be achieved by the tubular body having openings through which the medium, i.e., in particular the blowing air, can exit (or enter when flowing back) so as to be outside the second flow path.

In addition, it would also be possible for the second flow path to be formed by the tubular body and the first flow path to be formed by the space between an outer wall of the tubular body and an outer circumferential wall.

In an embodiment, the first flow path, or first flow path, is given by a distance between the tubular body and a wall surrounding this tubular body.

In this case, the tubular body and the surrounding wall can be connected to each other by webs and in particular radially extending webs.

In addition, these radial webs can also be used to centre the blowing nozzle. In this way, a predetermined proportion of centring surfaces can still be retained.

In a further embodiment, the tubular body has at least one opening through which the medium can exit in a radial direction, wherein this opening forming a section of the first flow path.

This means that at least a part of this blowing air exits through this opening and thus also at least in a radial direction with respect to the application device. In an embodiment, the tubular body has a circumferential wall. This also has a main opening at the end. In addition, a further opening is arranged in this circumferential wall. This opening thus also extends in the longitudinal direction of the tubular body, or in the longitudinal direction of the plastic preform to be expanded.

In an embodiment, the at least one opening is an elongated hole. In an embodiment, this elongated hole extends at least also in the longitudinal direction of the application device. In addition, this elongated hole can run both straight and obliquely (with respect to the longitudinal direction of the plastic preforms).

In an embodiment, several of these openings are provided. In an embodiment, these openings are evenly or symmetrically distributed in a circumferential direction of the tubular body.

In an embodiment, the application device has an air deflection means or an air deflector which forces air into the mouth area of the plastic preform. This can be a kind of spoiler, for example, which directs the air at least partially onto this area.

In an embodiment, the application device has a sealant to seal against a support ring of these plastic preforms. This means that in this case, sealing does not take place with respect to a mouth edge of the plastic preform, but with respect to the support ring, which such plastic preforms usually have.

In an embodiment, the at least one lateral opening, or these lateral openings, are formed in a lower region of the tubular body, i.e., in a region that projects further into the preform. For example, the openings can be arranged in a lower half, or a lower third, of the tubular body. In an embodiment, the tubular body has a first section that has no openings and a section lying under the longitudinal direction which has at least one, a plurality of openings.

Embodiments of the invention are further directed to a forming device for forming plastic preforms into plastic containers. This forming device has a movable and, in particular, rotatable carrier on which a plurality of apparatus of the type described above are arranged.

Embodiments of the invention are further directed to an application device for acting upon plastic preforms with a flowable and in particular gaseous medium in order to expand these plastic preforms. This application device has an annular sealing section which is suitable and intended for sealing off the air flow entering the plastic preform from an environment during the application of the plastic preform with the gaseous medium. Furthermore, the application device has a tubular body which projects at least partially into the plastic preform to be expanded during the expansion process.

According to embodiments of the invention, the application device has or forms at least one first flow channel or flow path for the flowable medium, which guides and/or directs at least a portion of the flowable medium to an inner wall of the mouth area in order to cool this inner wall.

Thus, embodiments of the invention are also directed to an application device or a blowing nozzle in a special embodiment, namely a blowing nozzle which also serves to cool the plastic preform and in particular its mouth area during its expansion. In an embodiment, this application device is also suitable for cooling the plastic preform or the manufactured container during a relief process.

Embodiments of the invention are further directed to a method for forming plastic preforms into plastic containers, wherein the plastic preforms are expanded within a blow mould by being acted upon by a flowable and, in particular, gaseous medium and are acted upon and expanded by the flowable medium by an application device, wherein the application device is applied to a mouth area of the plastic preforms in order to act upon them with the flowable medium.

According to embodiments of the invention, the application device forms at least one first flow channel or flow path for the flowable medium, which guides and/or directs at least a portion of the flowable medium to an inner wall of the mouth area in order to temper and, in particular, cool this inner wall.

In particular, the application device directs the portion of the flowable medium to an area of the mouth in which the plastic material is to be stretched little, or in which a wall of the plastic material is thicker than in other areas, relative to the manufactured container.

BRIEF DESCRIPTION

Some of the embodiments will be described in detail, with reference to the following figures, wherein like designations denote like members, wherein.

DETAILED DESCRIPTION

Figure 1:
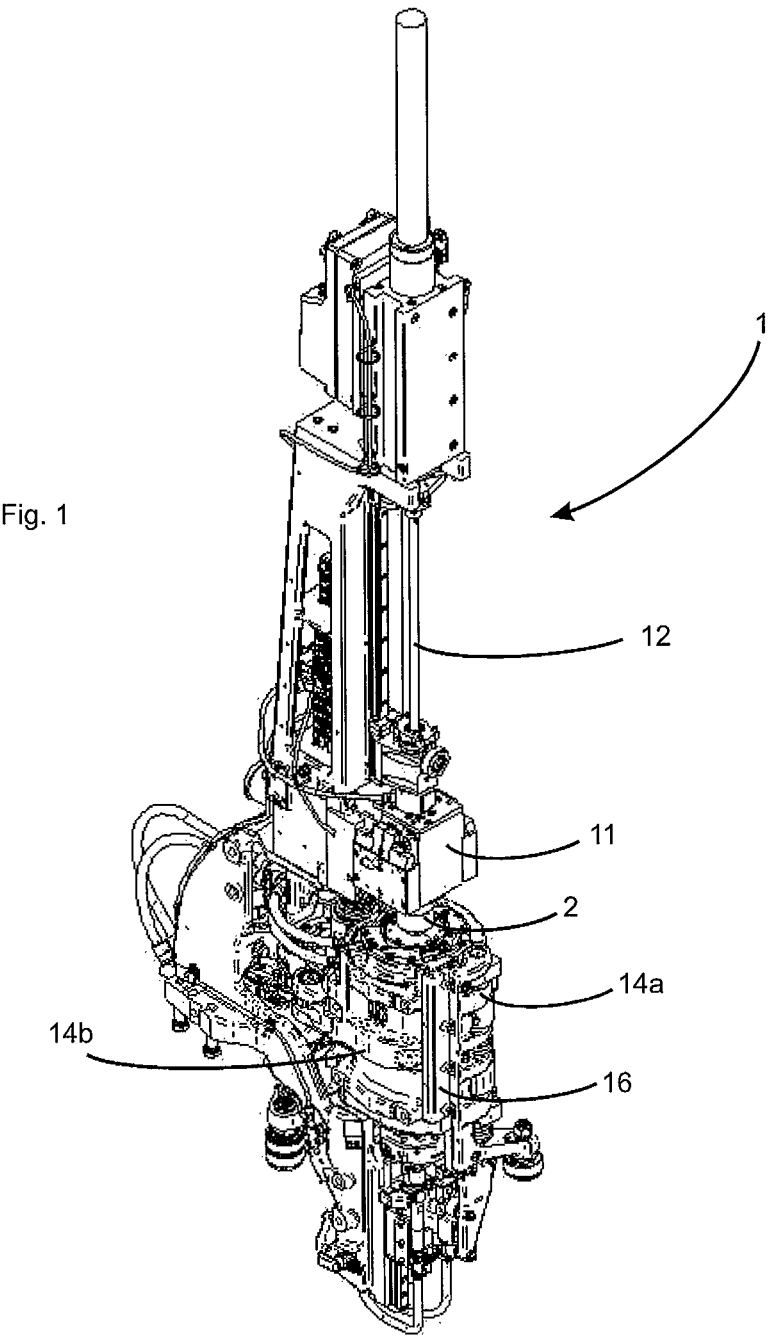
FIG. 1 depicts a schematic representation of a forming station.

FIG. 1 shows a representation of a forming station 1, or an apparatus for forming plastic preforms into plastic containers. This has two blow mould carrier parts 14a, 14b, on which (indirectly or directly) blow mould side parts (not shown) are arranged. These blow mould parts, together with a base part (also not shown), form a cavity within which the plastic preforms are expanded to form the plastic containers. The reference sign 16 indicates a locking mechanism which serves to lock the blow moulds in a closed state, in particular during the expansion process.

The reference sign 11 identifies a valve block, which in this case has a plurality of valves that serve to apply different pressure levels to the plastic preforms. Reference sign 2 indicates the application device for acting upon the plastic preforms with the flowable and, in particular, gaseous medium. This application device can be fed onto the plastic preforms or placed against a mouth of the plastic preforms.

The reference sign 12 indicates a rod-like body or a stretching rod which can be inserted into the interior of the plastic preforms in order to stretch them in their longitudinal direction.

Figure 2A:
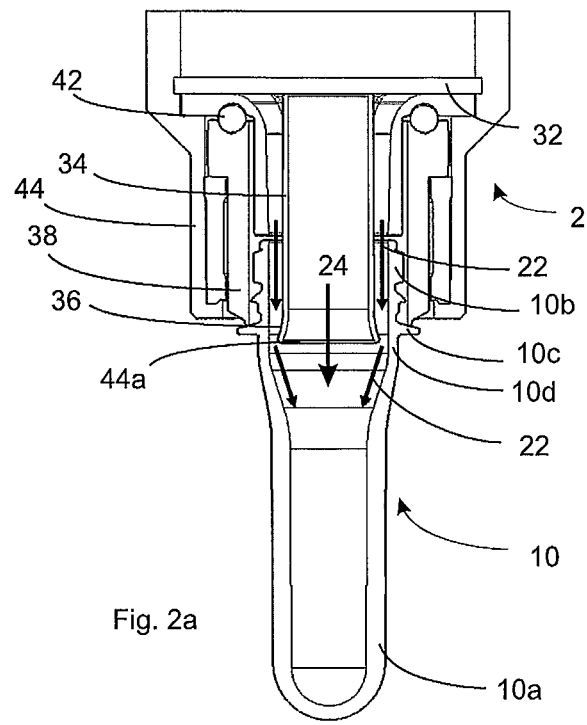
FIG. 2a depicts an illustration of an application device placed on a plastic preform.

FIG. 2a shows a representation of the application device (also referred to as blowing nozzle in the following) 2, which here is in contact with a plastic preform 10 during the expansion of the plastic preform. This plastic preform 10 has a base body 10a and a mouth area 10b. An external thread or an external contour is arranged on the mouth area 10b, onto which a container closure can be screwed or plugged.

The reference sign 10c indicates a support ring of the plastic preform and the reference sign 10d indicates a region of the plastic preform arranged below this support ring, which ideally is also to be cooled by the application device 2 described here.

The blowing nozzle 2 has a sleeve body or circumferential body 44 within which a sealing device 38 is movable in the vertical direction so as to achieve a seal with respect to the support ring 10c of the plastic preform.

Reference numeral 34 indicates the above-described tubular body that extends into the plastic preform in sections during expansion of the plastic preform. It can be seen here that a lower end 44a of this tubular body lies below the support ring 10c. In an embodiment, during expansion of the plastic preform, the end of the tubular body lies in a region of the support ring.

In an embodiment, the tubular body has a cross-section sufficient to move a stretching rod within the tubular body. In an embodiment, a stretching rod is therefore guided through the tubular body.

The reference sign 36 indicates an expansion of the tubular body in the manner of a spoiler, which serves to direct air flowing in through the blowing nozzle to the areas 10d of the plastic preform. Thus, the tubular body has an end portion with a widening and, in particular, continuously widening cross-section. In an embodiment, the tubular body has a circular cross-section.

The flow path of the blowing air entering the plastic preform is represented by the arrows 22. Thus, the arrows 22 represent the first flow channel that is used to cool the plastic preform or the areas 10d. In particular, a region of the inner wall of the plastic preform is to be cooled, as explained above.

Thus, in the design of the application device 2 shown in FIG. 2a, the first flow path runs between the tubular body 34 or its inner wall and the mouth area of the plastic preform or its outer wall.

The reference sign 24 indicates a second flow channel, which here also flows along the tubular body 34 into the interior of the plastic preform. This flow channel reaches the interior of the plastic preform directly and, unlike the air in the flow channel 22, is not guided specifically to the inner wall of the plastic preform. In the design shown in FIG. 2a, the first flow path 22 therefore completely surrounds the second flow path 24.

Figure 2B:
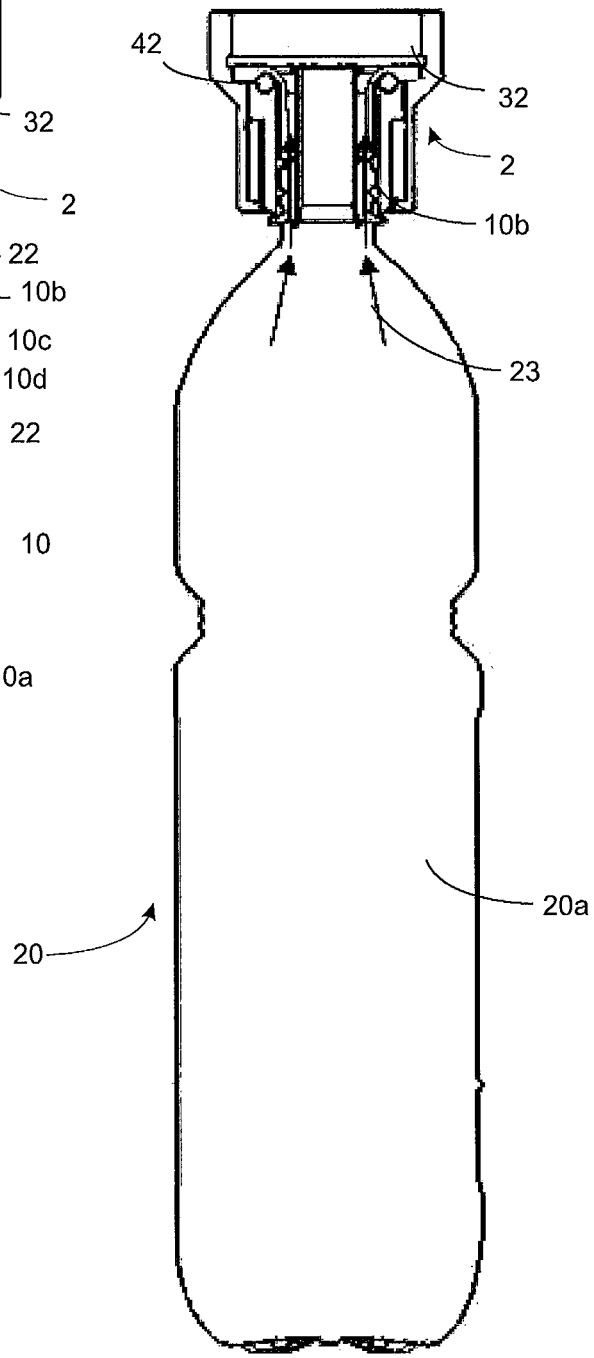
FIG. 2b depicts a representation of the application device with an expanded plastic container arranged thereon.

FIG. 2b shows a representation of the application device or blowing nozzle 2, which is here applied to an expanded container 20, wherein the base body 20a is already inflated. The reference sign 23 indicates the return flow path via which the air flows back through the application device 2 when the container is discharged. During this backflow, a cooling effect can again be achieved, in particular in the area 10d below the support ring 10c.

Figure 3:
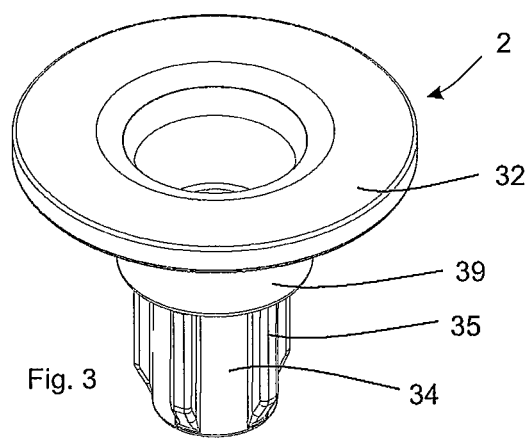
FIG. 3 depicts a configuration of an application device or blowing nozzle.

FIG. 3 shows a first embodiment of an application device 2, which has a base body 32 on which the tubular body 34 is arranged. In the embodiment shown in FIG. 3, a second circumferential body 39 is shown. Here, the first flow channel is also formed by the space between an inner wall of the circumferential body 39 and the tubular body 34. The reference sign 35 indicates webs, which are also arranged here between the tubular body 34 and the circumferential body 39. These webs project radially outwards with respect to the tubular body 34.

Figure 4:
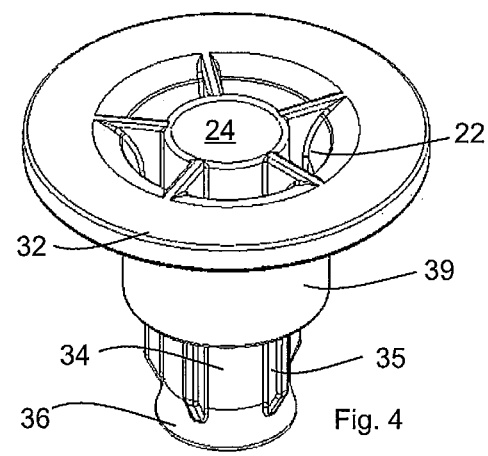
FIG. 4 depicts another configuration of an application device or blowing nozzle.

FIG. 4 shows a further embodiment of the application device 2. Here again the webs 35 are provided, as well as the tubular body 34 and the circumferential body 39. In addition, the carrier 32 is also provided, on which these two bodies are arranged. In contrast to the embodiment shown in FIG. 3, the webs in this embodiment also already extend in an upper region of the carrier 32.

It can be seen that here the first flow channel 22 is again formed by the distance between the tubular body 34 and the inner wall of the circumferential body 39. The second flow channel 24 runs inside the tubular body 34. A stretching rod (not shown) can also be guided in the interior of the tubular body.

Figure 5:
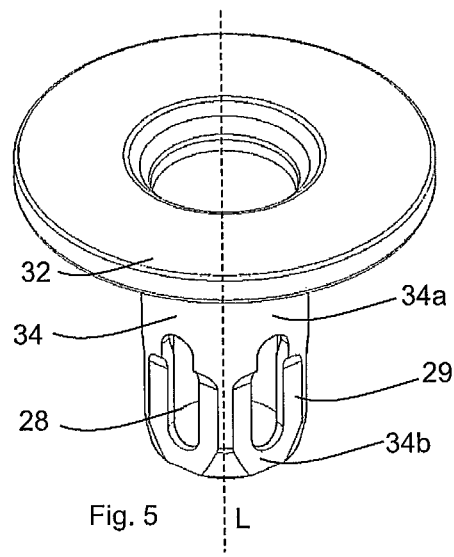
FIG. 5 depicts another configuration of an application device or blowing nozzle.

FIG. 5 shows another embodiment of an application device 2. Here, too, the carrier 32 is provided, as well as the tubular body 34 arranged on this carrier, which has an upper section 34a and a lower section 34b. Several openings 28 are arranged in the lower section, through which the air (or generally the flowable medium) can also exit in a radial direction in order to cool the inner wall of the plastic preform. Here, too, cooling takes place in particular in the areas below the support ring.

The reference sign 29 indicates a flattened wall on which the openings 28 are arranged. These walls facilitate the flow of air into the plastic preform.

Thus, in the embodiment marked in FIG. 5, a splitting of the first and second flow path is only achieved in the lower area of the tubular body 34, namely in the area of the openings. Part of the air exits radially through the openings 28, forming the first flow channel or flow path 22. The first flow channel or flow path 24 can be formed by the central opening in the lower region 34b of the tubular body 34.

However, in one embodiment, it would also be possible for the tubular body to be closed or, in particular, almost closed on its underside (i.e., essentially only allowing the stretching rod to pass through) and in this way for the air to exit exclusively through the openings 28. Thus, it would also be conceivable that a seal is provided between a stretching rod and the tubular body. It is also conceivable that an inner section of the tubular body is tapered.

Figure 6:
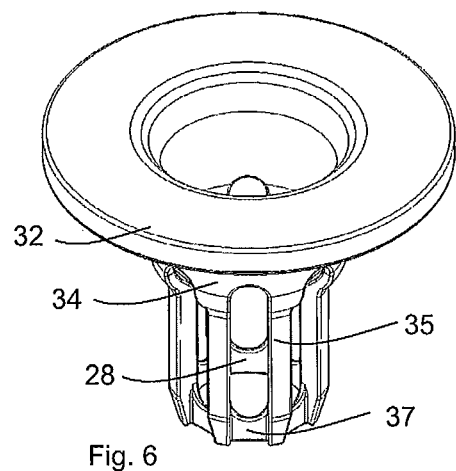
FIG. 6 depicts another configuration of an application device or blowing nozzle.

FIG. 6 shows a further embodiment of an application device according to embodiments of the invention. Here, too, openings 28 are provided on the tubular body, wherein here the tubular body is essentially formed by the webs 35 and an annular section 37.

Figure 7:
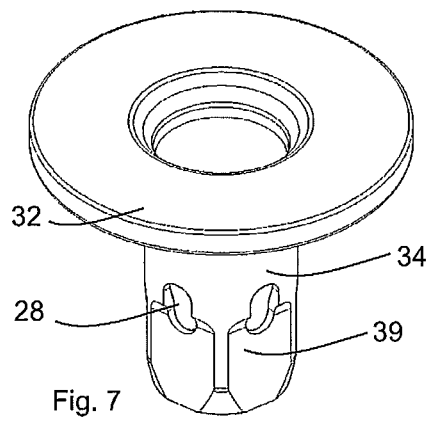
FIG. 7 depicts another configuration of an application device or blowing nozzle.

FIG. 7 shows a further embodiment of an application device according to embodiments of the invention. Here, too, several, or more precisely four, openings 28 are provided through which air can escape in a radial direction and thus cool the inner wall of the plastic preform. Below these openings there are again flat surfaces 39, which favour the exit of the flowing air.

Figure 8:
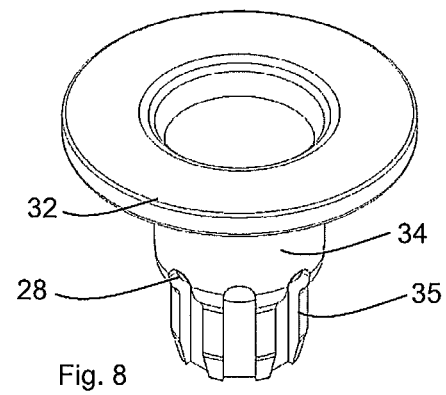
FIG. 8 depicts another configuration of an application device or blowing nozzle.

In the embodiment shown in FIG. 8, a plurality of webs is again provided. The openings are here in an upper section of the tubular body 34 or in an area where the webs 35 begin and through these openings the air can also escape in the radial direction.

Figure 9:
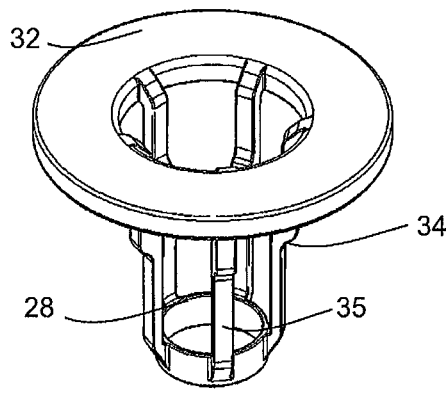
FIG. 9 depicts another configuration of an application device or blowing nozzle.

FIG. 9 shows a further design of an application device according to embodiments of the invention. In this embodiment, the tubular body is formed by a plurality of webs with spaces between them forming the openings 28. Thus, one (namely the second) flow path of the air exits again in a vertical downward direction, while another (namely the first) flow path exits radially outward.

In the embodiment shown in FIG. 9, the majority of the blown air exits through the openings 28 or the spaces between the webs 35.

Figure 10:
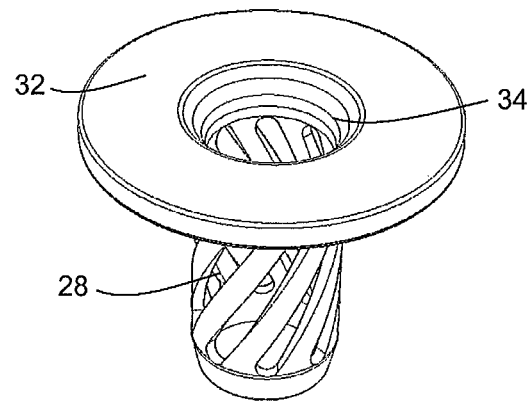
FIG. 10 depicts another configuration of an application device or blowing nozzle.

In the embodiment shown in FIG. 10, openings 28 are also provided, wherein these extend here spirally downwards, i.e., a longitudinal direction of these openings does not extend in a vertical direction here, but in a spirally direction.

However, the tubular body 34 is also arranged here on the carrier 32. The spirally design of the openings achieves a twisting of the flow paths.

In an embodiment, in all the embodiments shown, a carrier is provided (here denoted by the reference signs 32) to which the above-mentioned tubular body is arranged.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS 1 transforming station
2 application device/blowing nozzle
10 plastic preform
10a base body
10b mouth area
10c support ring
10d area below the support ring
11 valve block
12 rod-like body
14a, 14b blow mould carrier parts
16 locking mechanism
22 arrows air flow direction/first flow channel
23 return flow path
24 second flow channel
28 openings
29 flattened wall
32 carrier
34 tubular body
34a upper section
34b lower section
35 webs
36 expansion/spoiler
37 circular section
38 sealing device
39 second circumferential body/plane surfaces
44 sleeve body/circumferential body
44a end of the tubular body

The invention claimed is:

1. An apparatus for forming plastic preforms into plastic containers, having a blow mould which forms a cavity within which the plastic preforms can be expanded to form the plastic containers, and with an application device which is suitable and intended for acting upon the plastic preforms with a flowable medium in order to expand them, wherein the application device can be placed against a mouth area of the plastic preforms in order to act upon these with the flowable medium, wherein the application device forms at least one first flow channel for the flowable medium which guides and/or directs at least a portion of the flowable medium to an inner wall of the mouth area in order to temper this inner wall, wherein the application device has a tubular body which projects into the plastic preform during an expansion of the plastic preform and which forms a flow path of the flowable medium which does not reach the inner wall of a mouth region and the flow path is given by a distance between the tubular body and a wall surrounding this tubular body.

2. The apparatus according to claim 1, wherein the application device forms at least two flow paths for the flowable medium, which are at least partially separated from one another, wherein at least one of these flow paths being designed in such a way that it guides and/or directs at least a portion of the flowable medium to an inner wall of the mouth area.

3. The apparatus according to claim 2, wherein the second flow path is designed in such a way that it does not direct the flowable medium onto an inner wall of the mouth area.

4. The apparatus according to claim 1, wherein the tubular body is rotationally symmetrical with respect to a longitudinal axis of the application device.

5. The apparatus according to claim 4, wherein the first flow path extends at least partially radially outside the second flow path.

6. The apparatus according to claim 4, wherein the first flow path surrounds the second flow path in a circumferential direction of the application device.

7. The apparatus according to claim 1, wherein the tubular body comprises at least one opening through which the medium can exit in a radial direction, wherein the opening forming a portion of the first flow path.

8. The apparatus according to claim 7, wherein the opening is an elongated hole.

9. An application device for acting upon plastic preforms with a gaseous medium in order to expand these plastic preforms, having an annular sealing section which is suitable and intended, during the application of the plastic preform with the gaseous medium, to seal off the air flow entering the plastic preform from an environment, and having a tubular body, which during the expansion process projects at least partially into the plastic preform to be expanded, wherein the application device forms at least one first flow channel for the flowable medium, which conducts and/or directs at least a portion of the flowable medium to an inner wall of the mouth area in order to temper this inner wall, wherein the application device has a tubular body which projects into the plastic preform during an expansion of the plastic preform and which forms a flow path of the flowable medium which does not reach the inner wall of a mouth region and the flow path is given by a distance between the tubular body and a wall surrounding this tubular body.

10. A method for forming plastic preforms into plastic containers, wherein the plastic preforms are expanded within a blow mould by being acted upon by a flowable medium and are expanded by an application device with the flowable medium, wherein the application device is applied to a mouth area of the plastic preforms, wherein the application device forms at least one first flow channel for the flowable medium which guides and/or directs at least a portion of the flowable medium to an inner wall of the mouth area in order to temper this inner wall, wherein the application device has a tubular body which projects into the plastic preform during an expansion of the plastic preform and which forms a flow path of the flowable medium which does not reach the inner wall of a mouth region and the flow path is given by a distance between the tubular body and a wall surrounding this tubular body.

* * * * *